United States Patent [19]

Bedard et al.

[11] 4,376,969

[45] Mar. 15, 1983

[54] CONTROL SIGNAL AND ISOLATION CIRCUITS

[75] Inventors: James F. Bedard; Scott E. Cutler; Charles W. Eichelberger, all of Schenectady; Salvatore F. Nati, Jr., Syracuse, all of N.Y.

[73] Assignee: General Electric Company, New York, N.Y.

[21] Appl. No.: 242,783

[22] Filed: Mar. 11, 1981

[51] Int. Cl.³ ............................................. H02P 13/16
[52] U.S. Cl. .................................... 363/78; 323/902; 323/909; 315/DIG. 7
[58] Field of Search ................................... 363/19–26, 363/41, 78–80, 95, 97–98; 323/902, 909, 351; 315/156–159, DIG. 7

[56] References Cited

U.S. PATENT DOCUMENTS

| 3,693,027 | 9/1972 | Garaway | 323/902 X |
| 3,771,040 | 11/1973 | Fletcher et al. | 363/21 |
| 3,777,188 | 12/1973 | Mazur | 323/902 X |
| 4,210,947 | 7/1980 | Koizumi | 363/21 X |

Primary Examiner—William M. Shoop
Assistant Examiner—Peter S. Wong
Attorney, Agent, or Firm—Walter C. Bernkopf

[57] ABSTRACT

Circuits for providing a variable-amplitude D.C. analog control signal to a load, responsive to the time duration of a periodic, variable-pulse-width input signal, while providing isolation between the input signal circuit and the load circuit. Embodiments utilizing either a fly-back transformer or an optoelectronics isolator, are disclosed.

11 Claims, 8 Drawing Figures

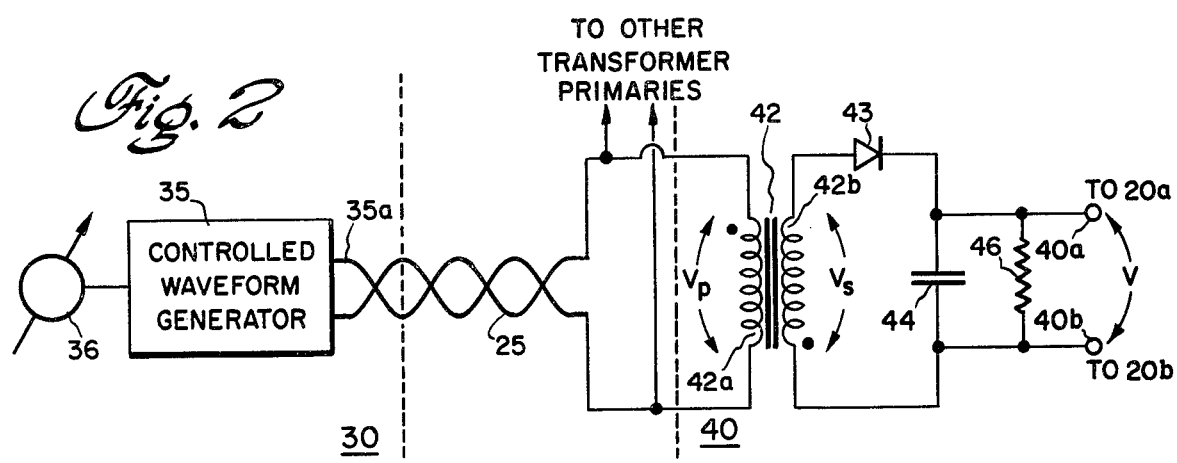
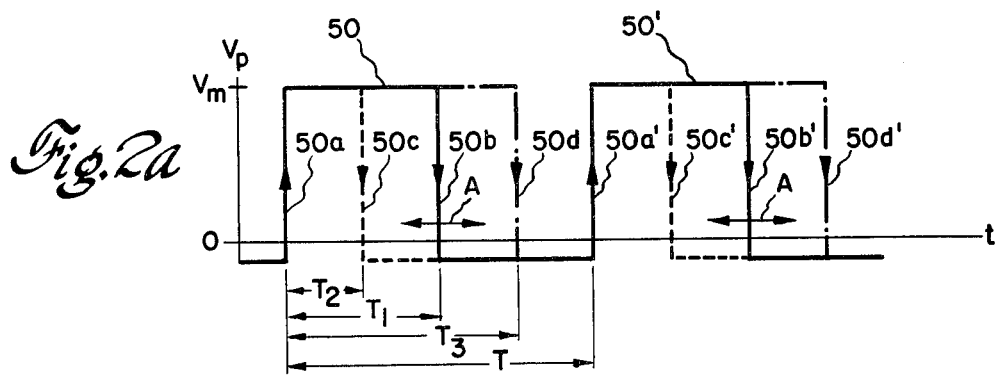
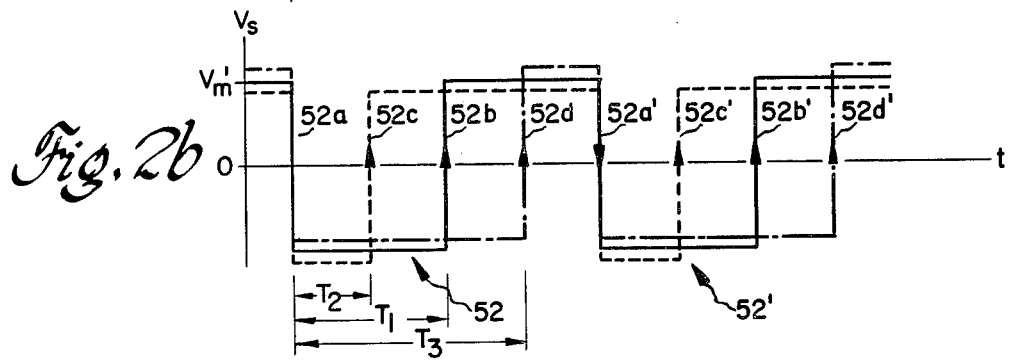
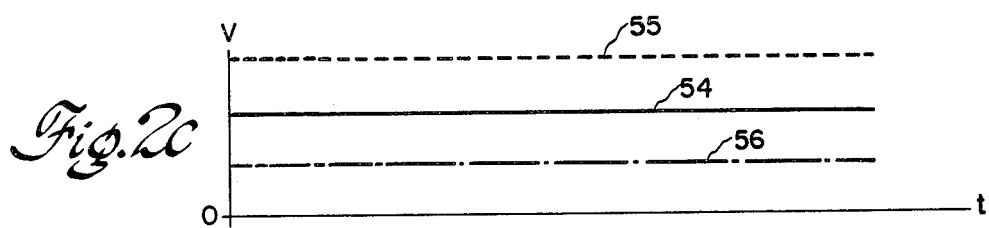

CONTROL SIGNAL AND ISOLATION CIRCUITS

BACKGROUND OF THE INVENTION

The present invention relates to isolation circuitry, and more particularly to novel circuitry for providing a variable-amplitude D.C. analog voltage isolated from, but responsive to, the duration of a periodic, variable pulse-width-modulated signal.

Many systems require that a relatively noise-immune signal, such as a pulse-width-modulated signal and the like, be transmitted from one location to another, with recovery of a D.C. analog signal being effected at a receiving location, for control of load apparatus. By way of example, due to the rising desire for reduced costs and increased efficiency in the area of energy management, it is desirable to realize appreciable savings in the control of the light output level of commercial fluorescent illumination systems. Such systems may control the output of fluorescent lamps at a number of locations by transmitting light output level control information from a central facility. Each remote fluorescent lamp may be energized by an associated ballast, such as is described and claimed in co-pending patent application Ser. No. 177,945, filed Aug. 14, 1980, now U.S. Pat. No. 4,357,422, assigned to the assignee of the present application, and incorporated herein by reference. The variable-luminous-output ballast/lamp combination thereof engenders cost and energy savings if: constant light output is maintained over the life of the lamp by adjustment to compensate for adverse effects, such as a cummulation of dirt and lumen depreciation; the lamp output is controlled as a function of the available natural daylight illumination; and lamp output is controlled as a function of both time and demand in a particular area. By use of interface circuitry such as described and claimed in co-pending application Ser. No. 242,782 filed Mar. 11, 1981, now U.S. Pat. No. 4,345,200, also assigned to the assignee of the present application incorporated herein by reference, the output-level-setting and on/off functions of an aforementioned ballast/lamp combination can be controlled by the magnitude of a single D.C. analog voltage signal. However, transmission of a variable amplitude analog signal over long distances suffers by pickup of random noise and other undesired signals, affecting the control signal amplitude. It is preferable to transmit control signals wherein a signal characteristic other than the signal amplitude, such as by modulation of a pulse width, conveys the desired information. Such transmission requires that circuitry be provided at each remote location for isolating the pulse-width-modulated (PWM) signal circuitry from subsequent analog signal circuitry (which may have potentially hazardous voltage and/or current levels therein) and also for converting the PWM signal to a D.C. analog level. The isolation and conversion circuitry must also have low cost, to maximize cost savings of such an energy management system.

BRIEF SUMMARY OF THE INVENTION

In accordance with the invention, circuitry for providing a variable amplitude D.C. analog signal responsive to a variable pulse-width-modulated signal, while maintaining isolation between the two signals, utilizes, in one presently preferred embodiment, a fly-back type transformer having a primary winding connected to a controlled waveform generator providing the variable pulse-width periodic waveform. The voltage across a secondary winding of the transformer is rectified to provide a unipolar D.C. analog voltage to a load.

In another presently preferred embodiment, an opto-electronic isolator receives the controlled waveform generator output to control the resistance between a source of operating potential and a filter capacitor. A D.C. analog voltage appears across the capacitor with magnitude responsive to the duty cycle of the variable pulse-width-modulated signal.

Accordingly, it is an object of the present invention to provide circuitry for providing a variable amplitude D.C. analog voltage isolated from, and responsive to, a variable pulse-width-modulated waveform.

This and other objects of the present invention will become apparent upon consideration of the following detailed description, when read in conjunction with the drawings.

BRIEF DESCRIPTION OF THE DRAWINGS

FIG. 2 is a schematic block diagram of a first preferred embodiment of an isolation-and-conversion circuit in accordance with the present invention;

FIGS. 2a, 2b and 2c are coordinated graphical illustrations of the primary winding, secondary winding and output voltage waveforms in the circuit of FIG. 2 and useful in understanding operations thereof;

DETAILED DESCRIPTION OF THE INVENTION

Figure 1:
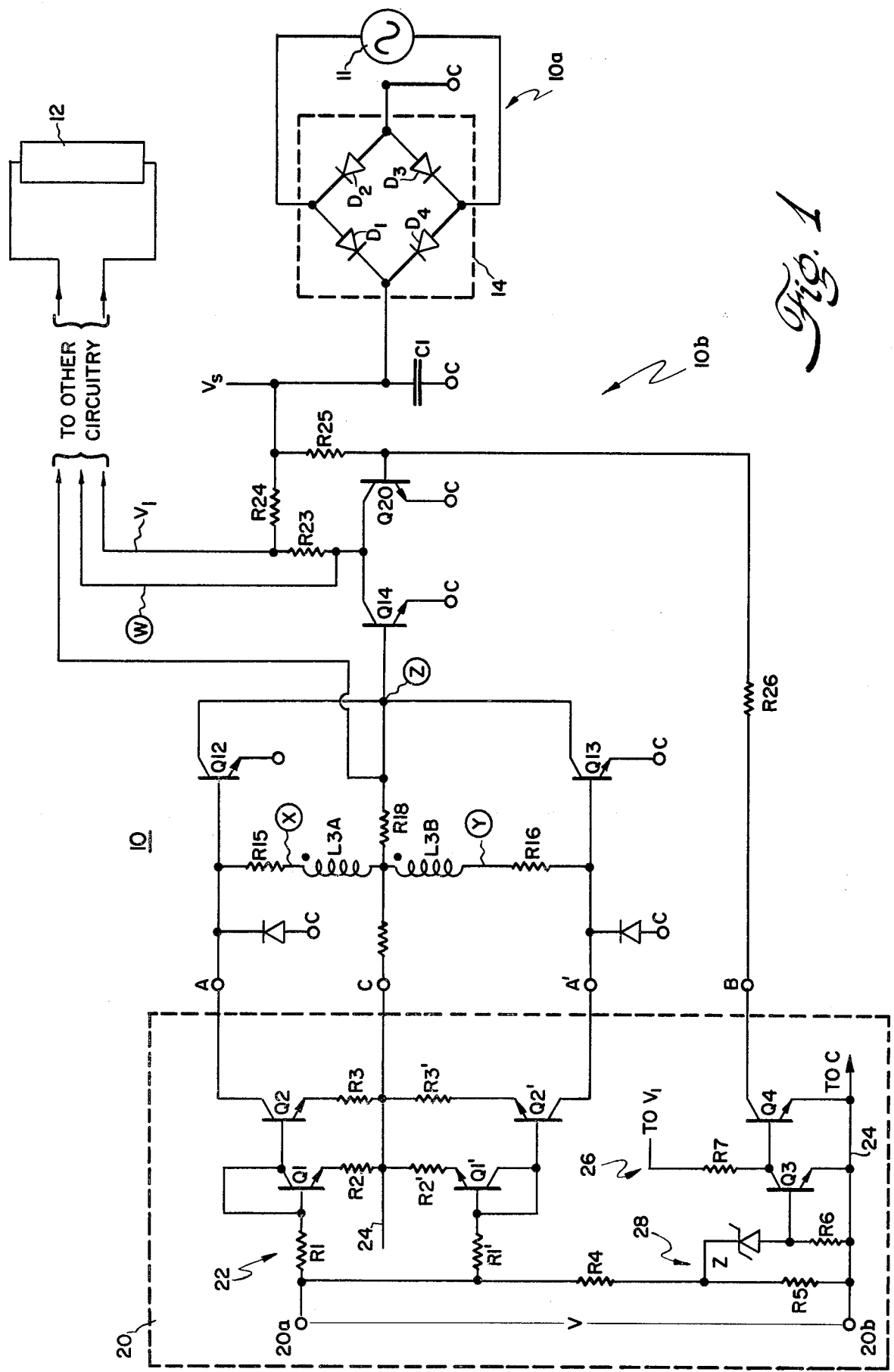
FIG. 1 is a schematic diagram of a portion of a ballast for energizing a fluorescent lamp from a A.C. source, and of a signal-input control circuit therefore, and useful in understanding one environment in which the present invention may be used.

Referring initially to FIG. 1, a load having a controllable output level is connected to an electrical energy source 11. The load is illustratively a ballast 10 and one or more gas discharge lamps, such as a fluorescent lamp 12. Ballast 10, of which only the power supply section 10a and control section 10b are shown, is configured to control the luminous output of fluorescent lamp 12 as a function of an externally-provided parameter, such as the magnitude of an impedance (electrical resistance) connected between control terminals A and A', and with the on-off function of the ballast-lamp combination being controlled by the impedance between an on-off terminal B and a ballast common line terminal C.

One method for providing a variable (dimmable) fluorescent lamp light level is described and claimed in co-pending application Ser. No. 177,835 and one embodiment of an inverter-type ballast utilizing that method for fluorescent lamp light level control is described and claimed in co-pending application Ser. No. 177,942, now U.S. Pat. No. 4,346,332, both of which applications were filed Aug. 14, 1980, and are assigned to the assignee of the present invention and are incorporated herein by reference in their entirety. Briefly, as described in the aforementioned patent applications, the A.C. energy source 11 is coupled to a bridge rectifier 14, comprised of diodes $D_1$–$D_4$, and a filter capacitor C1, which forms a power supply section 10a providing D.C. potential to the ballast, including a ballast di/dt control circuit section 10b and a ballast high-power inverter section (not shown) which is controlled by section 10b to provide relatively high-frequency energizing waveforms to fluorescent lamp 12. The level of light produced by fluorescent lamp 12 is a function of the frequency of the high-power inverter, which frequency is controlled by circuit section 10b. The control section 10b includes a di/dt sensor, or detector, consisting of transistors Q12 and Q13; resistors R15, R16, R17, R18, and R19; and dual transformer windings L3A and L3B. The di/dt-sensing control circuit has a threshold, or trip point, which is the point at which the voltages at points X and Y drop to a low enough value to turn off both of transistors Q12 and Q13. Accordingly, the pair of transformer windings are wound upon a portion of the inverter transformer (not shown), such that if the voltage across transformer winding L3A is positive at the dotted end, a current will flow from point X, through resistor R15, and turn on transistor Q12, while the voltage across winding L3B is simultaneously positive at the dotted end, whereby transistor Q13 is turned off. Similarly, if the voltage across winding L3B is negative at the dotted end, a current will flow from point Y, through resistance R16, turning on transistor Q13, while the voltage across winding L3A is negative at the dotted end, applying a negative voltage to the base electrode of transistor Q12, which transistor is cutoff. As the windings L3A and L3B are of an equal number of turns, it will be appreciated that the voltages at points X and Y (obtained by coupling both windings to the same transformer core with substantially equal coupling coefficients) are substantially equal in magnitude but of opposite polarity, as indicated by the phasing dots. Thus, when the voltage at point X drops below a predetermined threshold value, transistor Q12 which was previously conducting, will turn off. At the same time, the voltage at point Y is equal in magnitude, but of opposite polarity, such that transistor Q13 is not conducting, whereby a node Z is at a voltage above common line C potential, since neither transistor Q12 nor transistor Q13 are conducting. As node Z is not at common line C potential, transistor Q14 is caused to conduct. This initiates a reversal of inverter load voltage, as described in more detail in the aforementioned patent applications. This load voltage reversal reverses the polarity of the voltages across windings L3A and L3B, whereby transistor Q13 is caused to conduct and turn off transistor Q14. The point Y voltage changes until, at the present threshold value, transistor Q13 turns off and again raises the voltage at node Z, again causing transistor Q14 to turn on to initiate reversal of the load voltage. The above-summarized action continues in cyclic fashion, with transistors Q12 and Q13 being alternately turned on and off when the absolute amplitude of the voltage at one of points X and Y reaches a preset threshold value. This preset threshold value is established by the turns ratio of windings L3A and L3B. Resistances R15, and R16, of substantially equal magnitude, are utilized to convert the voltages at points X and Y to currents for driving the base electrodes of respective transistors Q12 and Q13. The threshold value, at which the load voltage is switched (and which therefore establishes the light output of load 12) may be changed by reducing the currents flowing into the base electrodes of transistors Q12 and Q13 by equal amounts, as by common line C potential or the opposite transistor base electrode. Thus, connection of a resistance (not shown) between input terminals A and A' causes the instantaneous positive potential at one of terminals A or A' to be reduced, upon application of the associated winding voltage to the associated base electrode of respective transistors Q12 or Q13, via the voltage divider provided by resistances R15 and R16 and the resistance between terminals A and A'. The voltage divider action is further enhanced by the connection of the opposite and of the external resistance back to the instantaneous negative voltage at the remaining one of terminals A or A', respectively. By means of this voltage divider action, the voltage, across that one of windings L3A and L3B associated with the transistor to be turned off, is applied to the base electrodes with decreasing magnitude for decreasing magnitudes of the external resistance whereby a particular polarity of voltage is applied to the load for increasing shorter time intervals before load voltage switching occurs, thereby increasing the load driving frequency and reducing the light output from fluorescent light 12. If the resistance between terminals A and A' is substantially zero (a short-circuit) the voltages at the base electrode of both transistors Q12 and Q13 will be substantially zero, with respect to their emitter electrodes, since the voltages at points X and Y are always of substantially the same magnitude but of opposite polarity, and as resistances R15 and R16 are of substantially equal value. In this condition, transistors Q12 and Q13 are always cutoff and a maximum inverter frequency (minimun lamp output) condition occurs. Conversely, if the resistance between input terminals A and A' is of a relatively high value, the transistor base electrodes will then be essentially isolated from one another and the respective transistors Q12 and Q13 will be alternately turned on with relatively low absolute voltage magnitudes across the associated one of windings L3A and L3B; this corresponds to a relatively low frequency of inverter operation whereby fluorescent light load 12 operates at substantial constant maximum power and produces a substantially constant maximum light output, as further described and claimed in U.S. Pat. No. 4,060,752 (wherein the base electrodes of the control transistors are in no way coupled to each other), which patent is assigned to the assignee of the present invention and incorporated in its entirety by reference hereto.

As previously described, the inverter portion of the ballast switches the voltage across load 12 responsive to transistor Q14 entering the cutoff condition. By paralleling transistor Q14 with another transistor Q20, inverter switching (and therefore the existence of a periodic waveform necessary to cause load power consumption) may be defeated if parallel transistor Q20 remains in the saturated condition, preventing the voltage at line W (the common collector connection between transistors Q14 and Q20) from rising. Thus, if the magnitude of a resistance R25 is chosen such that transistor Q20 normally receives sufficient base electrode current to remain in the saturating condition, the load 12 is turned off. If input terminal B, connected to the base electrode of transistor Q20, is connected to system common line C, the base electrode current of transistor Q20 is shunted to common and transistor Q20 is cutoff, allowing the load to be turned on and the light output thereof controlled by the resistance of element 20a between input terminals A and A'. Conversely, if input terminal B is disconnected (allowed to float) from the ballast common terminal C, or if a resistance R26 of sufficiently large magnitude is connected between input terminal B and the base electrode of transistor Q20, the transistor Q20 receives enough base electrode drive current to reenter saturation and turn off load 12.

A control circuit 20 utilizes a single control signal present at a single control circuit input 20a, and provides both an on/off output to load on/off terminal B with respect to load common terminal C, and essentially identical shunt control currents $I_c$ and $I_c'$, respectively, from load output level control terminals A and A'. The load level-setting shunt current, simulating the effect of a level-setting impedance, is described and claimed in the aforementioned co-pending application Ser. No. 242,782, filed Mar. 11, 1981, now U.S. Pat. No. 4,345,200. Briefly, the shunt currents $I_c$ and $I_c'$ are provided by a current-mirror circuit portion 22, having input resistors R1 and R1' (of essentially equal resistance magnitude), diode-connected first transistors Q1 and Q1', resistances R2 and R2' (of essentially equal resistance magnitude), second transistors Q2 and Q2', and emitter resistances R3 and R3', connected to common control circuit line 24, and of essentially equal resistance magnitude.

In operation, current mirror circuit portion 22 operates to shunt essentially equal control currents $I_c$ and $I_c'$ from load control input terminals A and A'. If the base-emitter voltage of the first and second transistors (Q1 and Q2 or Q1' and Q2') are essentially equal, if the D.C. current gains (B) of the second transistors Q2 and Q2' are essentially equal, and if the resistance magnitude of each of first transistor emitter resistance $R_2$ and $R_2'$ is much less than the resistance magnitude of the associated input resistance ($R_1$ or $R_1'$), then the shunt current magnitude $I_c$ or $I_c'$ is essentially given by $$I_c = I'_c = \frac{B(V/R1)}{(1 + (1 + B)(R3/R2))}$$

Accordingly, it will be seen that equal amount of current will be shunted from each load level-setting input terminals A and A', for a particular value of control circuit input voltage Vin, and that the essentially equal shunt currents will change proportional to the change in magnitude of the input voltage.

An on/off control section 26 utilizes an input voltage divider 28, comprised of resistances R4 and R5, connected between single input terminal 20a and common line 24. The voltage divider output, is connected via a zener diode Z to the base electrode of a transistor Q3. The collector electrode of transistor Q3 is connected to the base electrode of another base electrode Q4, and to one terminal of a load resistance R7. The emitter electrodes of both transistors Q3 and Q4 are connected to control circuit common line 24. The remaining terminal of load resistance R7 receives a voltage $V_1$ from the load power supply section 10a. The collector of transistor Q4 is connected to on/off control terminal B of the load.

In operation, if the control circuit input voltage V is of about zero magnitude, with respect to control circuit common line 24, transistor Q3 is cut-off. The value of resistance R7 is chosen to cause transistor Q4 to saturate when transistor Q3 is cut-off to provide a relatively low resistance between load common terminal C and load on/off terminal 20b, placing the load in the "on" condition. With a substantially zero magnitude input voltage, the magnitude of each of shunt current control current $I_c$ and $I_c'$ are essentially zero, whereby the load operates at maximum output level, e.g. maximum light output from lamp 12.

As the magnitude of input voltage V is increased, the magnitude of shunt control currents $I_c$ and $I_c'$ increase and reduce the load output level, e.g. the light output from lamp 12. Load output is continuously decreased until output voltage V reaches a magnitude (proportional to the sum of the zener diode voltage and the base-emitter voltage of transistor Q3) at which the increased resistance provided by the collector-emitter circuit of transistor Q4 turns off the load (ballast 10 and, therefore, lamp 12). While the "load off" level of the input voltage is being reached, the increasing input voltage magnitude continues to cause current mirror section 22 to draw increasingly greater magnitudes of shunt control current from level-setting load input terminals A and A', whereby the load output level continually decreases, with the load being eventually turned to the "off" condition. Thus, a variable-magnitude unipolar D.C. analog signal (voltage V) controls both the on/off function and output level of the load. The source of this input voltage should be isolated from the load common line C and control common line 24, which may not be at ground potential, to provide a required degree of personnel and equipment safety.

Referring now to FIG. 2, for noise-rejection purposes, we desire to use a pulse-width-modulated signal for transmission of load control information, via a medium 25, between a central facility 30 and each control circuit-ballast-lamp combination. Central facility 30 includes a controlled waveform generator 35 having a pulse-width-modulated signal appearing at its output 35a, for coupling to medium 25, with the duty cycle of the pulse-width-modulated (PWM) waveform being set by an associated duty-cycle control 36. Medium 25, shown herein is as a twisted wire pair (although it should be understood that coaxial cables and other like media may be as equally well utilized) transmits the control waveform to at least one isolation-and-conversion means 40, having output terminals 40a and 40b respectively coupled to control section input signals 20a and 20b, respectively, across which the single D.C. analog voltage V is to appear with magnitude responsive to the waveform duty cycle. In the embodiment of FIG. 2, means 40 includes an isolation transformer 42 of the fly-back type. A transformer primary winding 42a receives the controlled waveform voltage thereacross as a primary winding signal of magnitude $V_p$; energy is stored in the primary winding when $V_p$ is of positive polarity. As shown, medium 25 may be configured to transmit the controlled waveform voltage to a plurality of transformer primary windings in a plurality of means 40, each having an output connected to a different control circuit ballast-lamp combination. Transformer 42 has a secondary winding 42b, to which the stored energy is transferred when $V_p$ is negative; responsive to the energy transfer, a secondary voltage $V_s$ appears, across winding 42b, with opposite polarity (due to the fly-back transformer action) from the polarity of the voltage across primary winding 42a (as shown by the phasing of dots). A unidirectionally-conducting element 43, such as a semiconductor diode and the like, is connected to primary winding 42b in series with an energy-storage element 44, such as a capacitance and the like, whereby the storage element 44 is charged to the peak secondary winding voltage V by rectification of the periodic waveform thereat. As the time duration during which element 43 conducts is established by the duty cycle of the controlled PWM waveform, output control voltage V is of amplitude established by such duty cycle. A load resistance 46 is in parallel with storage element 44 to decrease the voltage thereacross with a predetermined time constant, to facilitate controlled decreases in the circuit output voltage V, responsive to the decreases in the control waveform duty cycle.

Referring to FIGS. 2 and 2a–2c, in operation, controlled waveform generator output 35a supplies a square waveform of a fixed frequency, having a single-cycle time interval T (FIG. 2a). The controlled waveform appears across the primary winding as voltage $V_p$ with a maximum positive amplitude $V_m$ and a slightly negative minimum amplitude with respect to zero, due to the transformer fly-back action. In any arbitrarily chosen cycle interval T, the primary winding waveform 50 has a rising leading edge 50a, corresponding to which is a leading edge 52a, of falling amplitude, of a waveform 52 of secondary voltage $V_s$ (FIG. 2b). At such time as the primary winding waveform 50 has a minimum level, the secondary winding waveform 52, being inverted therefrom, is at its maximum voltage level $V_m'$. At some time $T_1$ after occurrence of rising leading edge 50a, the primary winding waveform 50 has a falling trailing edge 50b. The time duration during which waveform 50 is positive with respect to total time interval T between successive waveform rising edges, e.g. leading edge 50a and the leading edge 50a' of a second waveform cycle 50', establishes the duty cycle ratio of the controlled waveform. To provide a lower duty cycle waveform a trailing edge 50c will occur after a time interval $T_2$ less than the time interval $T_1$ to trailing edge 50b; a falling trailing edge 50d at a time interval $T_3$ after rising leading edge 50a occurs if the controlled waveform has a greater duty cycle than the duty cycle of the waveform having a falling edge 50b. The time interval between rising and falling edges of the waveform may be adjusted, as shown by arrow A, such that a subsequent cycle waveform 50' may have a time interval between its rising leading edge 50a' and a falling edge, which is different from the time interval during which the previous waveform was positive, although the time interval T between successive rising edges remains substantially constant. Thus, if a second waveform 50' has a falling trailing edge 50b' occurring at the same time as time interval $T_1$ after the associated rising edge 50a' as the time interval $T_1$ in previous waveform 50, identical duty cycles occur. However, if the subsequent waveform 50' has a trailing falling edge 50c' or 50d' respectively, the duty cycle is respectively decreased or increased thereby.

The secondary voltage waveform 52 has a duty cycle controlled by the duty cycle of the primary voltage waveform 50, whereby the secondary voltage $V_s$ is of positive polarity for a time interval equal to the total cycle time interval T less the positive-polarity time duration of each primary voltage pulse 50 or 50'. In the nominal situation, secondary voltage $V_s$ attains the positive polarity at rising trailing edge 52b and remains positive until the falling leading edge 52a' of the next cycle, yielding a first, or nominal, D.C. analog signal amplitude 54 (FIG. 2c). If the primary winding positive polarity duration is increased (having falling trailing edge 50d in FIG. 2a), the secondary voltage rising trailing edge 52d provides a lower secondary winding duty cycle and a higher positive analog signal amplitude 55; if primary winding falling trailing edge 50c is utilized, the rising trailing edge 52c of FIG. 2b provides an increased duty cycle, allowing any directionally-conducting element 42 to charge storage element 44 to a lower positive analog signal level 56 (FIG. 2c). In this manner, control of the generator waveform duty cycle is translated, with isolation, to the amplitude of the single control voltage required by control circuit 20 associated with ballast 10 and lamp 12.

Figure 3:
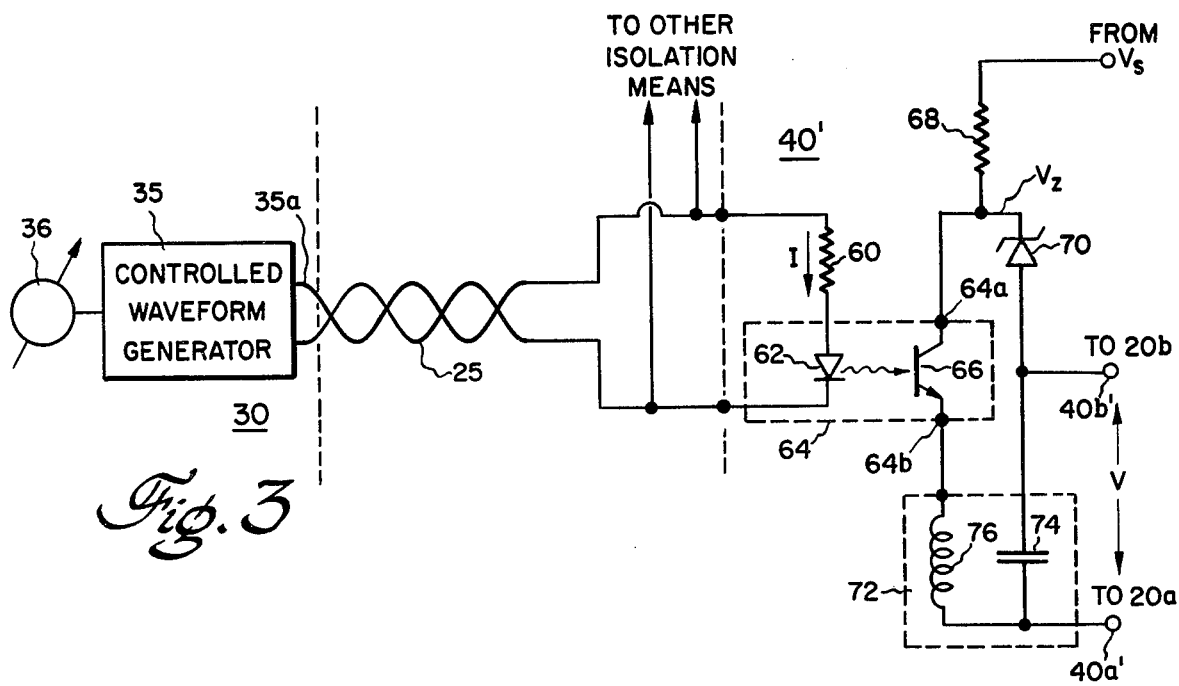
FIG. 3 is a schematic diagram of another preferred embodiment of the isolation and conversion circuitry of the present invention.
Figure 3A:
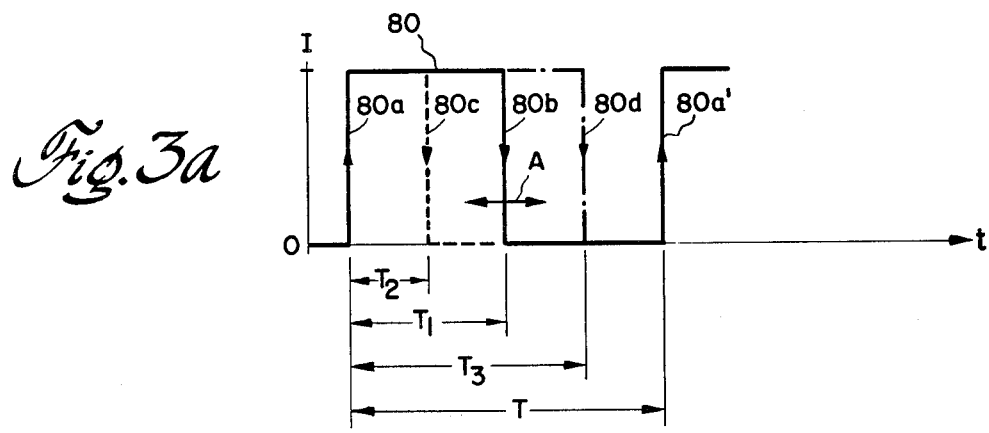
FIGS. 3a and 3b are a pair of coordinated graphs illustrating waveforms found in the circuit of FIG. 3, and useful in understanding operation thereof.
Figure 3B:
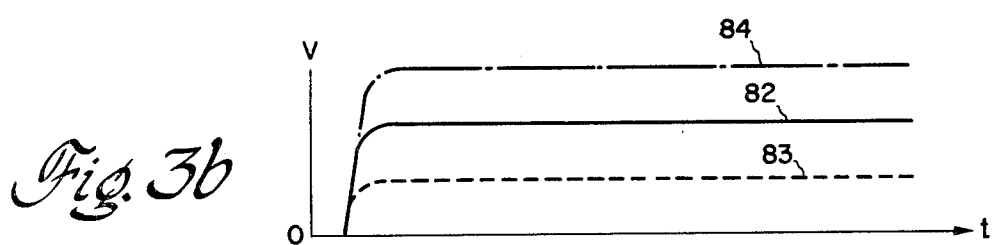

Referring now to FIGS. 3, 3a and 3b, another presently preferred embodiment of isolation-and-conversion means 40' utilizes the same remote controller 30, having controlled waveform generator 35 with an output 35a at which a variable-duty-cycle PWM waveform appears with duty cycle established by an associated control 36. The periodic waveform is again transmitted by medium 25 to means 40. The transmitted controlled waveform signal voltage appears across the series combination of a current-setting resistance 60 and a light-emitting means 62, such as a light emitting diode and the like, of an optoelectronics isolator 64. Isolator 64 also includes a luminous-flux-responsive means 66, such as a phototransistor and the like, having a resistance, between isolation means output terminals 64a and 64b, which is controlled responsive to the current I flowing through emitting means 62. Isolation means output terminal 64a is connected through a resistance 68 to a source of operating potential $V_s$, such as may be provided from the load, e.g. at the power supply section output of ballast 10 (FIG. 1). The junction of resistance 68 and isolation means output terminal 64a is connected through a voltage reference element 70, such as a zener diode and the like, to isolation-and-conversion means common output terminal 40b', for connection to the subsequent control circuit common line 20b. Thus, a voltage of preselected polarity and magnitude, e.g. positive polarity and voltage $V_z$ (the zener voltage of diode 70) is present at isolation means output terminal 64a. Isolation means output terminal 64b is connected through a filter means 72 to isolation-and-conversion means output terminal 40a', for connection to subsequent control circuit input terminal 20a. Filter 72 includes an energy storage element 74, such as a capacitance, and the like, for accepting charge, during time intervals when phototransistor 66 is in the low-resistance condition, to establish the output voltage V between output terminals 40a' and 40b'. Filter 72 preferably also includes a series reactive element 76, such as an inductance, to provide a desired degree of radio-frequency-interference filtering in conjunction with element 74.

In operation, the variable-duty-cycle waveform from generator 30 produces a pulse 80 of emitting means current I. The pulse time duration $T_1$, between a pulse leading edge 80a and a pulse leading edge 80b, establishes the duty cycle as the ratio thereof to the pulse repetition time interval T, from the leading edge 80a of the first pulse to the leading edge 80a of a subsequent pulse. By varying the time interval at which the trailing edge occurs, the pulse time interval and duty cycle may be either decreased, as with a trailing edge 80c at a time interval $T_2$ less than interval $T_1$, or increased, as with a trailing edge 80d at a time interval $T_3$ greater than interval $T_1$. During each pulse 80, emitting means 62 emits light flux, at least a portion of which is received by phototransistor 66; responsive to receipt of the flux, phototransistor 66 enters the conductive condition and gates the voltage $V_z$ to energy-storage means 74, increasing the charge stored therein and establishing an average (D.C.) level thereacross. Thus, for a nominal duty cycle, with pulse width $T_1$, a first level 82 of output voltage V is obtained. If the pulse time interval is decreased (with trailing edge 80c), duty cycle is decreased and the average D.C. level is decreased to a level 83 less than nominal level 82. If pulse duration is increased (with trailing edge 80d), an increase in the duty cycle and average D.C. voltage, to level 84, occurs. Thus, by controlling the duty cycle of the input waveform, from a remote controlled waveform generator, the analog D.C. value of a control voltage may be adjusted.

While several preferred embodiments of the present invention have been described herein, many variations and modifications will now become apparent to those skilled in the art. It is our intent, therefore, to be limited only by the pending claims and not by the specific details herein.

What is claimed is:

1. In a system for controlling the excitation of an electrical load over a range of intensity levels wherein a controlled generating means adapted to be located remotely from the electrical load establishes the level of load energization, comprising:
   (a) said controlled generating means comprising means for generating a pulse width modulated waveform having a variable duty cycle and load setting means for setting the duty cycle as a function of the desired level of load excitation;
   (b) load control means, d-c isolation means and detection means all adapted to be positioned remotely from said controlled generating means;
   (c) said d-c isolation means comprising input means for electrical connection to said controlled waveform generator and output means capable of providing a pulse width modulated waveform responsive to the waveform from said controlled generating means;
   (d) said detection means being connected in circuit between the output means of said d-c isolation means and the load control means to provide to said load control means an analog input signal of magnitude representative of the duty cycle of said pulse width modulated waveform;
   (e) said controlled generating means being adapted to generate the pulse width modulated waveform having a desired duty cycle independent of any feedback from the output of said d-c isolation means;
   (f) said load control means being constructed to vary the excitation of an electrical load over a range of intensity levels and to establish the level of excitation as a function of the duty cycle of the pulse width modulated signal generated by said controlled generating means.

2. The arrangement of claim 1 wherein said electrical load comprises gaseous discharge lamps and wherein said load control means comprises ballast means.

3. In a system for controlling the excitation of gaseous discharge lamps responsive to the frequency of a ballast inverter, the arrangement of claim 1 wherein said electrical load comprises gaseous discharge means and wherein said load control means comprises inverter type ballast means and means to vary the excitation frequency produced by said ballast means responsive to the duty cycle of the pulse width modulated waveform generated by said controlled generating means.

4. The arrangement of claim 3 wherein said load control means comprises means for inhibiting operation of said ballast means responsive to generation by said controlled generating means of a waveform of a predetermined duty cycle.

5. The arrangement of claim 1 wherein said d-c isolation means comprises a transformer.

6. The apparatus as set forth in claim 1, wherein said d-c isolation means is a transformer operating in the flyback mode and said input means comprises a primary winding receiving said pulse width modulated waveform from said controlled generating means and said output means comprising a secondary winding supplying said isolated waveform to said controlled generating means.

7. The apparatus as set forth in claim 1, wherein said d-c isolation means is an optoelectronics coupler.

8. The apparatus as set forth in claim 7, wherein said coupler includes a light-emitting diode emitting luminous flux at an intensity controlled by the amplitude of the waveform from said generating means; and a phototransistor having an output circuit resistance controlled responsive to receipt of flux from said light emitting diode.

9. The apparatus of claim 8, wherein said detection means comprises a source of operating potential; and an energy-storage element coupled between said load control means and common terminals and coupled to said source of operating potential via the output circuit of said phototransistor.

10. The apparatus of claim 9, further comprising a radio-frequency interference filtering element connected between said phototransistor output circuit and said energy storage element.

11. The apparatus as set forth in claim 10, wherein said storage element is a capacitance.

* * * * *